United States Patent
Hayashi et al.

(10) Patent No.: US 7,035,552 B2
(45) Date of Patent: Apr. 25, 2006

(54) OPTICAL RECEPTION APPARATUS AND OPTICAL TRANSMISSION SYSTEM

(75) Inventors: Michiaki Hayashi, Kamifukuoka (JP);
Tomohiro Otani, Kamifukuoka (JP);
Masatoshi Suzuki, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 796 days.

(21) Appl. No.: 10/186,099

(22) Filed: Jun. 28, 2002

(65) Prior Publication Data
US 2003/0002116 A1    Jan. 2, 2003

(30) Foreign Application Priority Data
Jun. 29, 2001    (JP)    ............... 2001-199599

(51) Int. Cl.
*H04B 10/06*    (2006.01)
(52) U.S. Cl. ............ 398/192; 398/27; 398/194
(58) Field of Classification Search ............ 398/27
See application file for complete search history.

(56) References Cited

U.S. PATENT DOCUMENTS 4,961,190 A * 10/1990 Nakajima ............... 714/704
2001/0053189 A1 * 12/2001 Kato ............... 375/316
2004/0013433 A1 * 1/2004 Alexander et al. ............ 398/91

FOREIGN PATENT DOCUMENTS

JP    4-78243    * 3/1992

OTHER PUBLICATIONS

T. Mizuochi, et al., Transparent Multiplexer Featuring Super FEC for Optical Transport Networking, proceedings of SubOptic 2001, pp. 484-487.

* cited by examiner

*Primary Examiner*—Leslie Pascal
(74) *Attorney, Agent, or Firm*—Christie, Parker & Hale, LLP

(57) ABSTRACT

An optical reception apparatus comprises an optical receiver to receive an optical signal from an optical transmission line, an error corrector to correct an error of the received signal and to transmit the error-corrected signal and error rate information before error correction, a judging apparatus to judge transmission quality of the optical transmission line according to the error rate information from the error corrector and a threshold value equal to an error rate lower than an error correction limit of the error corrector, and a selective breaker to transmit the signal whose error is corrected by the error corrector in normal state and to block transmission of the signal whose error is corrected by the error corrector when the judged result by the judging apparatus indicates deterioration of the transmission quality of the optical transmission line.

12 Claims, 2 Drawing Sheets

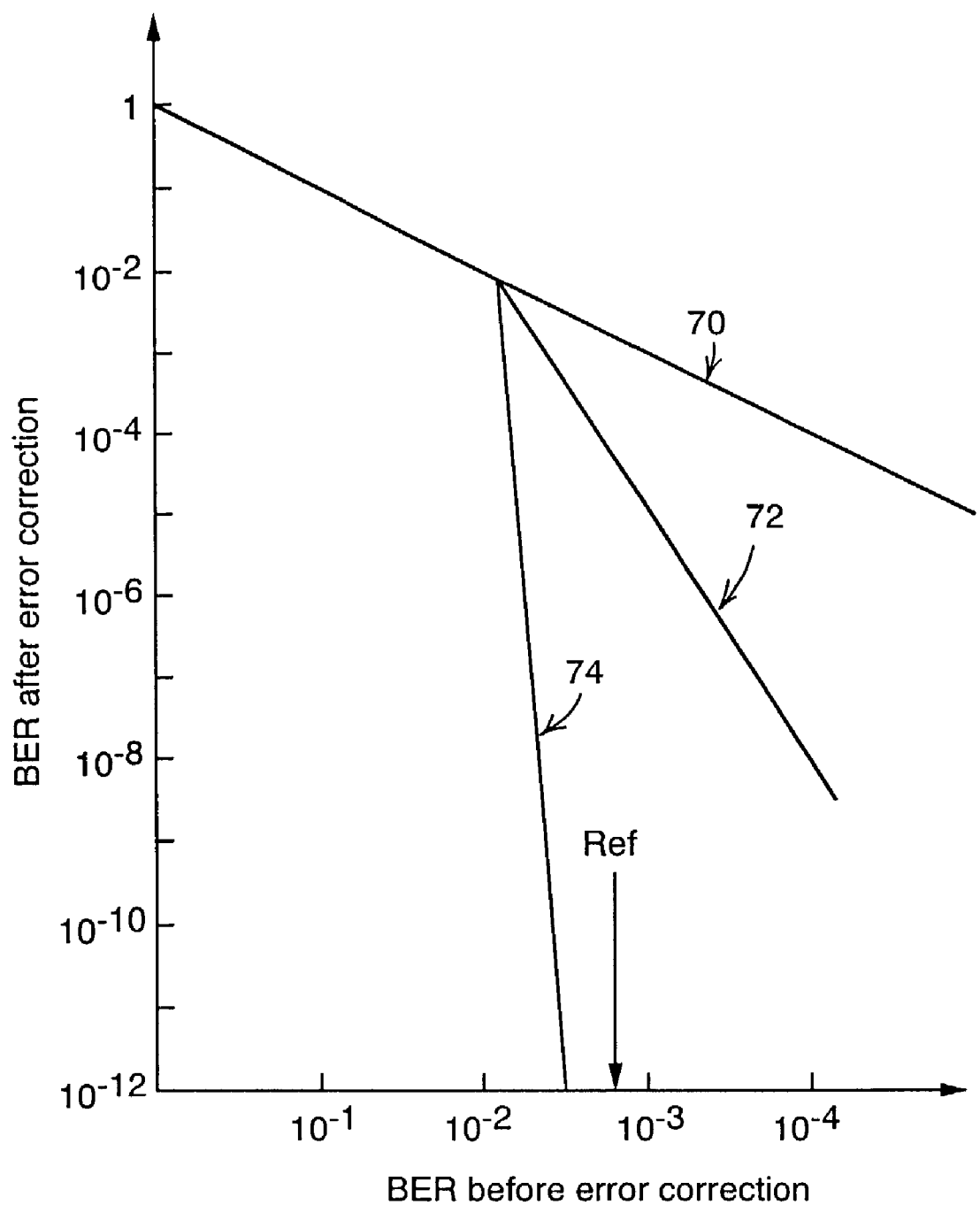

US 7,035,552 B2

OPTICAL RECEPTION APPARATUS AND OPTICAL TRANSMISSION SYSTEM

CROSS REFERENCE TO RELATED APPLICATIONS

This application is based upon and claims the benefit of priority from the prior Japanese Patent Application No. 2001-199599, filed Jun. 29, 2001, the entire contents of which are incorporated herein by reference.

FIELD OF THE INVENTION

This invention relates to an optical reception apparatus and an optical transmission system, and more specifically relates to an optical reception apparatus capable of informing deterioration of transmission quality in an optical communication system to the following apparatuses and an optical transmission system to control line connections using the optical reception apparatus.

BACKGROUND OF THE INVENTION

In an optical communication system, an optical transmitter error correction code encodes a SONET/SDH flame of OC-48/STM-16 or OC-192/STM-64 and sends it onto an optical fiber transmission line, and an optical receiver corrects transmission errors using an error correction code and outputs the SONET/SDH flame of OC-48/STM-16 or OC-192/STM-64. As an error correcting system, a foward error correction (FEC) system has been known. An FEC system having more advanced error-correcting ability is also well known (see, for instance, T. Mizouchi, et al., "Transparent multiplexer featuring super FEC for optical transport networking", proceedings of SubOptic 2001, pp. 484–487).

Generally, quality of an optical transmission line is unstable, and the unstableness appears more clearly as the transmission line distance becomes longer and the bit rate becomes higher. By introducing error-correcting technology with high correcting ability, it is possible to obtain transmission of practically error-free data even in a transmission line having poor quality. For instance, in an optical transmission line which quality varies in a range from $2\times10^{-3}$ to $4\times10^{-3}$ with its average quality of $3\times10^{-3}$, an error rate after error correction varies between an error-free state and a frame-loss state.

Also, an optical transmission system, specifically an optical transmission system of trunk lines is designed to be able to select from a plurality of lines or routes to prepare for line fault. An electric crossconnector or a photonic crossconnector is well known as a means to switch traffic.

A large number of transmission errors can be corrected by the FEC system. Since high correction ability is obtained in the error correcting technology described in the above paper, it is possible not only to realize practically error-free transmission in a wide range but also to use optical transmission lines having inferior quality.

In this error correcting technology, however, an error rate after error correction rapidly increases if an error rate before error correction exceeds a certain threshold value (see FIG. 6 of the above-described paper). For example, when an error rate before error correction deteriorates from $4\times10^{-3}$ to $8\times10^{-3}$, an error rate after error correction greatly worsens from $10^{-11}$ to $10^{-2}$.

In an optical transmission line requiring a high error correcting capability, a minor deterioration of transmission characteristics is likely to cause disabled conditions. Accordingly, when a transmission error sufficiently serious to cause such disablement occurs in a line, the line is switched to another line by a crossconnector.

However, any means to easily monitor such deterioration in transmission characteristics has not been proposed yet. Conventionally, an abnormal condition in a transmission line is merely detected on a result obtained by restoring a data carried by an optical carrier. Therefore, in a conventional system, alarm signals are output from many parts to inform deterioration of transmission characteristics in an optical fiber transmission line.

Conventionally, a crossconnector switches lines manually or automatically when an abnormal condition occurs in a transmission line as mentioned above. Some electric crossconnectors have an error monitoring function. When such an electric crossconnector is employed, it is possible to make the electric crossconnector automatically switch working lines when the error rate reaches a certain value. When such an automatic switching system is used, however, transmission characteristics often become unstable because the line switching causes chattering.

In addition, since signals are transmitted in an inferior transmission quality until the line having a high error rate is switched to another line, packet retransmission is repeated. This increases loads in the network.

In a photonic crossconnector, a special electric device must be installed to calculate an error rate of input optical signals. This reduces merits to utilize a photonic crossconnector instead of an electric crossconnector.

SUMMARY OF THE INVENTION

An optical reception apparatus according to the invention comprises an optical receiver to receive an optical signal from an optical transmission line, an error corrector to correct an error of the signal received by the optical receiver and to transmit the error-corrected signal and error rate information before error correction, a judging apparatus to judge transmission quality of the optical transmission line according to the error rate information from the error corrector and a threshold value equal to an error rate which is lower than an error correction limit of the error corrector, and a selective breaker to transmit the signal whose error was corrected by the error corrector in normal state and to block transmission of the signal whose error was corrected by the error corrector when the judged result by the judging apparatus indicates deterioration of the transmission quality of the optical transmission line.

An optical transmission system according to the invention comprises first and second optical fiber lines, an optical transmission terminal to selectively transmit an optical signal to either of the first and second optical fiber lines, and an optical reception terminal to selectively receive an optical signal from either of the first and second optical fiber lines, wherein the optical transmission terminal comprises first and second optical transmission apparatuses respectively connecting to the first and second optical fiber lines, each optical transmission apparatus having a error correction code encoding circuit to error correction code encode a transmission signal and a first selector to selectively supply the transmission signal to either of the first and second optical transmission apparatuses and to supply the transmission signal to the first optical transmission apparatus in the initial state, and the optical reception terminal comprises first and second optical reception apparatuses respectively connecting to the first and second optical fiber lines, each optical reception apparatus correcting an error of received signal and to transmit error rate information before error correction, a second selector selectable of either signal from the first and second optical reception apparatuses, a judging apparatus to judge transmission quality of the first optical fiber line according to the error rate information before error correction from the first optical reception apparatus, and a selective breaker to break signal transmission between the first optical reception apparatus and the second selector when the judged results of the judging apparatus indicate deterioration of the transmission quality.

A line switching method according to the invention to switch working lines in an optical transmission system comprising first and second optical fiber lines, an optical transmission terminal having a first selector to select one of the first and second fiber lines to transmit an optical signal and an optical reception terminal having a second selector to select either signal from the first and second optical fiber lines comprises a reception step to correct an error of signal from the first optical fiber line and to transmit the error corrected signal and error rate information before error correction, a judging step to judge transmission quality of the first optical fiber line by comparing the error rate information before error correction with a predetermined threshold value equal to an error rate lower than an error correction limit of the reception step, a selective breaking step to supply the error corrected signal from the reception step to the second selector at the beginning and to break transmission of the error corrected signal from the reception step to the second selector when the judged result of the judging step indicates deterioration of transmission quality of the first optical fiber line, an input detecting step to detect whether any signal enters a first port to which signals from the first optical fiber line enters in the second selector, a first switching step to switch from the first port of the second selector to a second port to which signals from the second optical fiber line enter when the first port has no input signal and to inform the optical transmission terminal to switch to the second optical fiber line, and a second switching step at the optical transmission terminal to make the first selector select the second optical fiber line to transmit the optical signal according to the switching information from the optical reception terminal.

BRIEF DESCRIPTION OF THE DRAWING

The above and other objects, features and advantages of the present invention will be apparent from the following detailed description of the preferred embodiments of the invention in conjunction with the accompanying drawings, in which:

FIG. 2 illustrates error rate characteristics before and after error correction.

DETAILED DESCRIPTION

Figure 1:
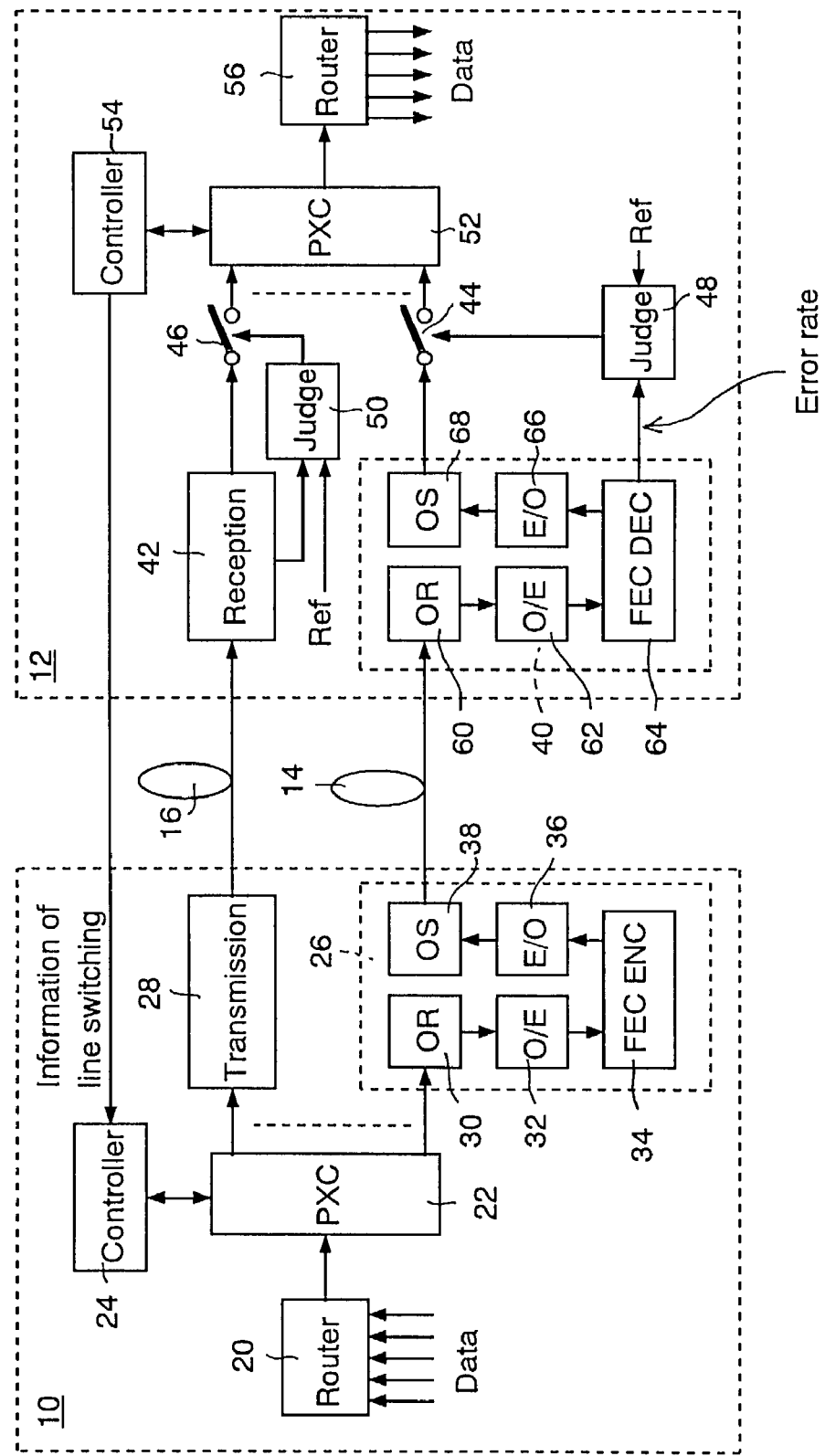
FIG. 1 shows a schematic block diagram of an embodiment according to the invention.

Embodiments of the invention are explained below in detail with reference to the drawings.

FIG. 1 shows a schematic block diagram of an embodiment according to the invention. A plurality of optical fiber lines (2 lines are shown in the illustration) 14 and 16 are selectable between a transmission terminal 10 and a reception terminal 12. It is assumed that the optical fiber line 14 is being selected at the beginning.

The configuration of the transmission terminal 10 is explained below. An optical router 20 applies data to be transmitted for the reception terminal 12 to a photonic crossconnector 22 out of input data (for example, OC-48/STM-16 form data) carried by a light wave. A controller 24 controls a route in the photonic crossconnector 22. Optical transmission apparatuses 26 . . . 28 respectively connect to a plurality of output ports of the photonic crossconnectors 22. At the beginning, the controller 24 controls the photonic crossconnector 22 to supply the input data to the optical transmission apparatus 26.

In the optical transmission apparatus 26, an optical receiver 30 receives an optical signal from the photonic crossconnector 22, and an opto-electric converter 32 converts the output from the optical receiver 30 into an electric signal and applies it to an FEC encoder 34. The FEC encoder 34 adds an error correction code of FEC to the signal from the opto-electric converter 32. An electro-optical converter 36 converts the error correction code encoded data from the FEC encoder 34 into an optical signal, and an optical transmitter 38 outputs the optical signal from the electro-optical converter 36 onto the optical fiber line 14 in a predetermined form.

An inside configuration of the optical transmission apparatus 28 is the same with that of the optical transmission apparatus 26. The optical transmission apparatus 28 processes an optical signal from the photonic crossconnector 22 in the same way with that of the optical transmission apparatus 26 and transmits onto an optical fiber line 16.

The configuration of the reception terminal 12 is explained below. Optical reception apparatuses 40 and 42 receive an optical signal from the optical fiber lines 14 and 16, respectively. The configurations of the optical reception apparatuses 40 and 42 are the same and the details are described later. The optical signals received by the optical reception apparatuses 40 and 42 enter a photonic crossconnector 52 through normally closed optical switches 44 and 46, respectively. Judging circuits 48 and 50 evaluate transmission quality of the optical fibers 14 and 16 according to error rate information before error correction of the optical fibers 14 and 16 by the optical reception apparatuses 40 and 42 and a judging threshold value Ref, and open or close the optical switches 44 and 46 according to the evaluated result. A controller 54 controls optical routes in the photonic crossconnector 52. The optical signal selected by the photonic crossconnector 52 is applied to an optical router 56. The optical router 56 then transmits the optical signal from the photonic crossconnector 52 to an apparatus (which is not illustrated) designated by the optical signal.

In the optical reception apparatus 40, an optical receiver 60 receives the optical signal from the optical fiber line 14, and an opto-electric converter 62 converts the output from the optical receiver 60 into an electric signal and applies it to an FEC decoder 64. The FEC decoder 64 corrects errors of the transmission data using the error correction code added by the FEC encoder 34 and applies the corrected data to an electro-optical converter 66 and an error rate before error correction to a judging circuit 48. The electro-optical converter 66 converts the error-corrected data from the FEC decoder 64 into an optical signal and applies it to an optical transmitter 68. The optical transmitter 68 applies the output optical signal from the electro-optical converter 66 to the photonic crossconnector 52 through the optical switch 44 in a predetermined form.

The judging circuit 48 compares the error rate before error correction by the FEC decoder 64 with a predetermined threshold value Ref to judge transmission quality of the optical fiber line 14. The threshold value Ref is set to the error rate before error correction which is smaller than a correction limit of the FEC. When the transmission quality is poor, the judging circuit 48 opens (turns off) the optical switch 44. That is, the connection of the optical signals between the optical receiver 40 and the photonic crossconnector 52 is blocked. Judging conditions of the judging circuit 48 are explained later.

The characteristic operation of this embodiment is explained below. The data to be transmitted from the terminal 10 to the terminal 12 passes through the router 20, the photonic crossconnector 22, the optical transmission apparatus 26, the optical fiber line 14, the optical reception apparatus 40, the optical switch 44, the photonic crossconnector 52, and the router 56. The FEC encoder 34 in the optical transmission apparatus 26 encodes the transmission data, and the FEC decoder 64 in the optical reception apparatus 40 corrects the transmission error in the optical fiber line 14 using an error correction code added by the FEC encoder 34. The FEC decoder 64 transmits the error corrected data to the electro-optical converter 66 and applies the error rate information before error correction to the judging circuit 48.

The judging circuit 48 judges the transmission quality of the optical fiber line 14 according to the error rate from the FEC decoder 64 and the predetermined threshold value Ref and turns off (opens) the optical switch 44 when the transmission quality is poor and turns on (closes) the optical switch 44 when the transmission quality is satisfactory. When the optical switch 44 is turned off, the optical signal transmission from the optical reception apparatus 40 to the photonic crossconnector 52 is shut off.

When the transmission of the optical signal from the optical reception apparatus 40 to the photonic crossconnector 52 is shut off, the data of the terminal 10 emitted from the optical router 56 becomes practically non-signal. An operator or a controller, which is not illustrated, can switch from the optical fiber 14 to the optical fiber line 16 before the transmission quality of the optical fiber 14 deteriorates exceeding the error correcting ability of the FEC system.

Most of the photonic crossconnectors 52 comprise a function to monitor the existence of input light in each input port. Using this function, the controller 54 can detect that no optical signal inputs from the optical reception apparatus 40. When no optical signal inputs although the input port is in use, it means that a fault occurred in a signal transmission system connecting to the input port. In this case, the controller 54 controls the photonic crossconnector 52 to select another line, the optical fiber line 16 in the embodiment, and informs the controller 24 in the photonic crossconnector 22 of the transmission terminal 10 of the line switching (including the information of newly employed lines) through any transmission medium. The controller 24 controls the photonic crossconnector 22 to switch from the optical fiber line 14 to the optical fiber line 16 according to the information from the controller 54.

The judging method of the judging circuit 48 is explained below. FIG. 2 shows the relation between error rates before and after error correction using the FEC and a threshold value Ref. FIG. 2 corresponds to FIG. 6 of the above-mentioned paper. The horizontal axis expresses an error rate before error correction, and the vertical axis expresses an error rate after error correction. Reference numeral 70 denotes a case without a FEC system, reference numeral 72 denotes a case when an initial FEC system is applied, and reference numeral 74 denotes when an improved FEC (super FEC) system is applied, respectively. A threshold value Ref is set to a value equal to an error rate before error correction which is smaller than an error correction ability limit of the improved FEC (super FEC) system.

As a second judging method, the judging circuit 48 turns off the optical switch 44 when the error rate from the FEC decoder 64 exceeds the threshold value Ref and continues for a certain period T1. The judging circuit 48 turns on the optical switch 44 when the error rate is less than the threshold value Ref for the certain period T1 or a certain period T2. In this method, instantaneous deterioration of transmission quality can be neglected. Because there is a possibility to be able to process such instantaneous deterioration of the transmission quality within the error correction ability since the threshold value Ref is set to be smaller than the error correction ability limit.

The transmission quality of an optical fiber line often shows a variation in which gradually changing deterioration and temporary instantaneous deterioration are put together. In a third method, the judging circuit 48 turns off the optical switch 44 when the error rate from the FEC decoder 64 exceeds the threshold value Ref as many times as a predetermined number of times K within a certain period T3, and turns on the optical switch 44 when the error rate is continuously smaller than the threshold value for a certain period T4 which is longer than T3. The reason is that, it is preferable to restart the operation after the transmission quality is recovered continuously and satisfactorily.

In the above examples, although the judging threshold value to turn on the optical switch 44 is set equal to the judging threshold value Ref to turn off the optical switch 44, it is preferable that the judging threshold value to turn on the optical switch 44 is smaller than the judging threshold value Ref to turn off the optical switch 44 in consideration of the satisfactory recovery of the transmission quality. Also, this helps to avoid chattering of the optical switch 44.

In the embodiment shown in FIG. 1, although the optical switch 44 and the judging circuit 48 are disposed outside the optical reception apparatus 40 to make it understandable, it is obvious that the optical switch 44 and the judging circuit 48 can be disposed in the optical reception apparatus 40. Also, the optical switch 44 can be disposed in the photonic crossconnector 52.

In a case to employ an electric crossconnector instead of the photonic crossconnector 52, it is preferable to dispose an electric switch corresponding to the optical switch 44 on an output side of an opto-electric converter disposed between the optical reception apparatus 40 and the electric crossconnector. If the electric switch corresponding to the optical switch 44 is disposed on an input side of the opto-electric converter, it is likely that noises etc. enter the electric crossconnector and make the electric crossconnector misjudge whether any input signal exists or not.

In the embodiment, since signals are blocked before the transmission quality of a transmission fiber line becomes a condition impossible to correct, the following apparatuses can detect the transmission quality by monitoring whether any signal exists or not and therefore can afford to switch over lines earlier. By this operation, severe transmission errors can be avoided in advance with a simple configuration.

In a method in which alarms are emitted from a number of places, it takes a long time to specify a fault location and a fault source. However, in a method to block signals like the one used in the invention, a number of alarms become relatively small making it easier to find out a fault.

As readily understandable from the aforementioned explanation, according to the invention, transmission quality of an optical transmission line can be monitored to switch lines before the transmission quality becomes a condition impossible to correct with a simple configuration using existing elements. That is, severe errors can be avoided in advance using a simple configuration.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical reception apparatus comprising:
   an optical receiver to receive an optical signal from an optical transmission line;
   an error corrector to correct an error of the signal received by the optical receiver and to transmit the error-corrected signal and error rate information;
   a judging apparatus to evaluate transmission quality of the optical transmission line according to the error rate information from the error corrector and a threshold value equal to an error rate lower than an error correction limit of the error corrector; and
   a selective breaker to transmit the error-corrected signal, and to block transmission of the error-corrected signal when the judging apparatus indicates deterioration of transmission quality of the optical transmission line, wherein the judging apparatus controls the selective breaker to block the transmission of the error-corrected signal when the error rate information exceeds the threshold value for a predetermined period.

2. The optical reception apparatus of claim 1 wherein the judging apparatus controls the selective breaker to block the transmission of the error-corrected signal when the error rate information exceeds the threshold value for a predetermined number of times within the predetermined period.

3. The optical reception apparatus of claim 1 or 2 wherein the judging apparatus controls the selective breaker to block the transmission of the error-corrected signal when the error rate information is smaller than the threshold value for a second predetermined period.

4. An optical transmission system comprising:
   first and second optical fiber lines;
   an optical transmission terminal to selectively transmit an optical signal to either of the first and second optical fiber lines; and
   an optical reception terminal to selectively receive an optical signal from either of the first and second optical fiber lines,
   wherein the optical transmission terminal comprises first and second optical transmission apparatuses respectively connecting to the first and second optical fiber lines, each optical transmission apparatus having an error correction code encoding circuit to encode a transmission signal and a first selector to selectively supply the transmission signal to either of the first and second optical transmission apparatuses and to supply the transmission signal to the first optical transmission apparatus in the initial state,
   wherein the optical reception terminal comprises first and second optical reception apparatuses respectively connecting to the first and second optical fiber lines, each optical reception apparatus to correct an error of received signal and to transmit error rate information before error correction, a second selector to select signals from the first and second optical reception apparatuses, a judging apparatus to evaluate transmission quality of the first optical fiber line according to the error rate information before error correction from the first optical reception apparatus, and a selective breaker to block signal transmission between the first optical reception apparatus and the second selector when the evaluated results of the judging apparatus indicate deterioration of transmission quality, and
   wherein, when the second selector detects no signal at an input port corresponding to the output of the first optical reception apparatus, the second selector selects an output signal from the second optical reception apparatus and informs the first selector to switch to a selected line.

5. An optical transmission system comprising:
   first and second optical fiber lines;
   an optical transmission terminal to selectively transmit an optical signal to either of the first and second optical fiber lines; and
   an optical reception terminal to selectively receive an optical signal from either of the first and second optical fiber lines,
   wherein the optical transmission terminal comprises first and second optical transmission apparatuses respectively connecting to the first and second optical fiber lines, each optical transmission apparatus having an error correction code encoding circuit to encode a transmission signal and a first selector to selectively supply the transmission signal to either of the first and second optical transmission apparatuses and to supply the transmission signal to the first optical transmission apparatus in the initial state,
   wherein the optical reception terminal comprises first and second optical reception apparatuses respectively connecting to the first and second optical fiber lines, each optical reception apparatus to correct an error of received signal and to transmit error rate information before error correction, a second selector to select signals from the first and second optical reception apparatuses, a judging apparatus to evaluate transmission quality of the first optical fiber line according to the error rate information before error correction from the first optical reception apparatus, and a selective breaker to block signal transmission between the first optical reception apparatus and the second selector when the evaluated results of the judging apparatus indicate deterioration of transmission quality, and
   wherein the judging apparatus controls the selective breaker to block the transmission of the error-corrected signal when the error rate information exceeds a predetermined threshold value equal to an error rate lower than an error correction limit for a predetermined period.

6. The optical transmission system of claim 5, wherein the judging apparatus controls the selective breaker to block the transmission of the error-corrected signal when the error rate exceeds a predetermined threshold value equal to an error rate lower than an error correction limit for a predetermined number of times within the predetermined period.

7. The optical transmission system of claim 5 or 6 wherein the judging apparatus controls the selective breaker to block the transmission of the error-corrected signal when the error rate information is smaller than the predetermined threshold value for a second predetermined period.

8. A line switching method to switch working lines in an optical transmission system comprising first and second optical fiber lines, an optical transmission terminal having a first selector to select one of the first and second optical fiber lines to transmit an optical signal and an optical reception terminal having a second selector to select either signal from the first and second optical fiber lines comprising:

correcting an error of signal from the first optical fiber line with a first error correction limit and transmitting the error corrected signal and error rate information;

evaluating transmission quality of the first optical fiber line by comparing the error rate information with a predetermined threshold value equal to an error rate lower than the first error correction limit;

supplying the error corrected signal to the second selector at the beginning and blocking transmission of the error corrected signal to the second selector when the evaluated transmission quality indicates deterioration of transmission quality of the first optical fiber line;

detecting whether any signal enters a first port to which signals from the first optical fiber line enters in the second selector;

switching from the first port of the second selector to a second port to which signals from the second optical fiber line enter when the first port has no input signal and informing the optical transmission terminal to switch to the second optical fiber line; and controlling the first selector to select the second optical fiber line to transmit the optical signal according to the switching information from the optical reception terminal.

9. A method for monitoring transmission quality of an optical transmission line comprising:

receiving an optical signal from the optical transmission line;

correcting an error of the received optical signal according to an error correction limit for generating an error-corrected signal and error rate information;

transmitting the error-corrected signal and the error rate information:

evaluating the transmission Quality of the optical transmission line according to the error rate information and a threshold value equal to an error rate lower than the error correction limit of the error corrector; and transmitting the error-corrected signal and blocking transmission of the error-corrected when the evaluated transmission Quality indicates deterioration of the transmission quality of the optical transmission line, wherein the evaluating step comprises blocking the transmission of the error-corrected signal when the error rate information exceeds a predetermined threshold value equal to an error rate lower than the error correction limit for a predetermined period.

10. The method of claim 9 wherein the evaluating step comprises blocking the transmission of the error-corrected signal when the error rate exceeds a predetermined threshold value equal to an error rate lower than the error correction limit for a predetermined number of times within the predetermined period.

11. The method of claim 9 wherein the evaluating step comprises blocking the transmission of the error-corrected signal when the error rate information is smaller than the predetermined threshold value for a second predetermined period.

12. The method of claim 10 wherein the evaluating step comprises blocking the transmission of the error-corrected signal when the error rate information is smaller than the predetermined threshold value for a second predetermined period.

* * * * *

UNITED STATES PATENT AND TRADEMARK OFFICE
CERTIFICATE OF CORRECTION

PATENT NO.        : 7,035,552 B2                                Page 1 of 1
APPLICATION NO. : 10/186099
DATED             : April 25, 2006
INVENTOR(S)       : Hayashi et al.

It is certified that error appears in the above-identified patent and that said Letters Patent is hereby corrected as shown below:

In the Claims

| | |
|---|---|
| Column 9, line 16, Claim 8 | Delete "enters", Insert --enter-- |
| Column 10, line 2, Claim 9 | Delete ":", Insert --;-- |
| Column 10, line 3, Claim 9 | Delete "Quality", Insert --quality-- |
| Column 10, line 9, Claim 9 | Delete "Quality", Insert --quality-- |

Signed and Sealed this

Seventeenth Day of April, 2007

JON W. DUDAS
*Director of the United States Patent and Trademark Office*